(12) United States Patent
Pantar et al.

(10) Patent No.: US 12,164,536 B2
(45) Date of Patent: **\*Dec. 10, 2024**

(54) ENTERPRISE SEARCH USING DATABASE VIEWS

(71) Applicant: SAP SE, Walldorf (DE)

(72) Inventors: Aravinda Pantar, Karlsruhe (DE); Steffen Tatzel, Nussloch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,312

(22) Filed: Jul. 14, 2023

(65) Prior Publication Data

US 2023/0359639 A1 Nov. 9, 2023

Related U.S. Application Data

(63) Continuation of application No. 17/719,081, filed on Apr. 12, 2022, now Pat. No. 11,741,117, which is a
(Continued)

(51) Int. Cl.
*G06F 16/248* (2019.01)
*A23L 2/02* (2006.01)
(Continued)

(52) U.S. Cl.
CPC .............. *G06F 16/248* (2019.01); *A23L 2/02* (2013.01); *A23L 2/38* (2013.01); *A23L 2/60* (2013.01);
(Continued)

(58) Field of Classification Search
None
See application file for complete search history.

(56) References Cited

U.S. PATENT DOCUMENTS 8,726,179 B2   5/2014  Yerkes et al.
9,069,844 B2 * 6/2015  Roy ...................... G06F 16/248
(Continued)

OTHER PUBLICATIONS

"U.S. Appl. No. 16/720,684, Examiner Interview Summary mailed Nov. 26, 2021", 4 pgs.
(Continued)

*Primary Examiner* — Kim T Nguyen
(74) *Attorney, Agent, or Firm* — SCHWEGMAN LUNDBERG & WOESSNER, P.A.

(57) ABSTRACT

Techniques for implementing enterprise search using database views are disclosed. In some example embodiments, a computer-implemented method comprises: receiving database queries; generating, for each database query, a corresponding database view comprising a result set arranged in one or more fields of a table; storing the corresponding database views of the database queries; generating a corresponding search configuration for each one of the stored database views, the corresponding search configuration indicating the field(s) of the table of the stored database view; storing the corresponding search configurations for the stored database views; receiving an enterprise search query comprising one or more terms entered via a full-text search field; generating search results for the enterprise search query based on the term(s) using the stored search configurations to access data in the field(s) of the tables of the stored database views; and causing the generated search results to be displayed.

20 Claims, 8 Drawing Sheets

Related U.S. Application Data continuation of application No. 16/720,684, filed on Dec. 19, 2019, now Pat. No. 11,334,585.

(51) Int. Cl.

| | | |
|---|---|---|
| *A23L 2/38* | (2021.01) | |
| *A23L 2/60* | (2006.01) | |
| *A23L 2/68* | (2006.01) | |
| *A23L 29/269* | (2016.01) | |
| *A23L 33/135* | (2016.01) | |
| *A23L 33/20* | (2016.01) | |
| *G06F 16/242* | (2019.01) | |
| *G06F 16/25* | (2019.01) | |

(52) U.S. Cl.
CPC .............. *A23L 2/68* (2013.01); *A23L 29/269* (2016.08); *A23L 33/135* (2016.08); *A23L 33/20* (2016.08); *G06F 16/2445* (2019.01); *G06F 16/252* (2019.01)

(56) References Cited

U.S. PATENT DOCUMENTS

| | | | | |
|---|---|---|---|---|
| 9,189,566 | B2* | 11/2015 | Roy | ........................ G06F 16/90 |
| 11,334,585 | B2* | 5/2022 | Pantar | ................... A23L 33/135 |
| 11,379,451 | B2 | 7/2022 | Brunel et al. | |
| 11,386,086 | B2 | 7/2022 | Purcell et al. | |
| 11,741,117 | B2* | 8/2023 | Pantar | ................... G06F 16/252 |
| | | | | 426/599 |
| 11,868,445 | B2* | 1/2024 | Jackson | ............. G06F 16/9024 |
| 12,038,958 | B1* | 7/2024 | Soubbotin | ............. G06F 16/954 |
| 2008/0016047 | A1 | 1/2008 | Dettinger et al. | |
| 2008/0016048 | A1 | 1/2008 | Dettinger et al. | |
| 2008/0040320 | A1 | 2/2008 | Dettinger et al. | |
| 2014/0244638 | A1 | 8/2014 | Yerkes et al. | |
| 2016/0063107 | A1 | 3/2016 | Schukovets et al. | |
| 2016/0378826 | A1 | 12/2016 | Bensberg et al. | |
| 2017/0315784 | A1 | 11/2017 | Sarferaz | |
| 2018/0246983 | A1* | 8/2018 | Rathod | ................. G06F 16/972 |
| 2018/0260481 | A1* | 9/2018 | Rathod | ................. G06F 16/958 |
| 2018/0314762 | A1* | 11/2018 | Rathod | ................. H04L 63/102 |
| 2020/0073986 | A1 | 3/2020 | Purcell et al. | |
| 2020/0133937 | A1 | 4/2020 | Cruanes et al. | |
| 2020/0250167 | A1 | 8/2020 | Brunel et al. | |
| 2020/0334254 | A1 | 10/2020 | Arye et al. | |
| 2020/0364222 | A1 | 11/2020 | Sarapuk et al. | |
| 2021/0191928 | A1* | 6/2021 | Pantar | ....................... A23L 2/02 |
| 2022/0256894 | A1* | 8/2022 | Pantar | ..................... A23L 33/20 |
| 2022/0292173 | A1* | 9/2022 | Henry | ..................... G06F 21/45 |
| 2023/0359639 | A1* | 11/2023 | Pantar | ....................... A23L 2/38 |
| 2023/0376491 | A1* | 11/2023 | Sharp | ................. G06F 16/24575 |
| 2023/0376509 | A1* | 11/2023 | Sharp | ................. H04L 67/1021 |

OTHER PUBLICATIONS

"U.S. Appl. No. 16/720,684, Non Final Office Action mailed Aug. 3, 2021", 14 pgs.

"U.S. Appl. No. 16/720,684, Notice of Allowance mailed Jan. 20, 2022", 9 pgs.

"U.S. Appl. No. 16/720,684, Response filed Nov. 2, 2021 to Non Final Office Action mailed Aug. 3, 2021", 13 pgs.

"U.S. Appl. No. 17/719,081, Examiner Interview Summary mailed Feb. 15, 2023", 4 pgs.

"U.S. Appl. No. 17/719,081, Non Final Office Action mailed Dec. 6, 2022", 13 pgs.

"U.S. Appl. No. 17/719,081, Notice of Allowance mailed Apr. 14, 2023", 8 pgs.

"U.S. Appl. No. 17/719,081, Response filed Feb. 2, 2023 to Non Final Office Action mailed Dec. 6, 2022", 12 pgs.

\* cited by examiner

ENTERPRISE SEARCH USING DATABASE VIEWS

CROSS-REFERENCE TO RELATED APPLICATIONS

This application is a continuation of prior application Ser. No. 17/719,081, filed on Apr. 12, 2022, which is a continuation of prior application Ser. No. 16/720,684, filed on Dec. 19, 2019, which applications are incorporated by reference herein in their entireties.

TECHNICAL FIELD

The present application relates generally to the technical field of electrical computer systems, and, in various embodiments, to systems and methods of implementing an enterprise search using database views.

BACKGROUND

Many enterprise search systems suffer from slow performance and poor usability. Since enterprise search systems search for objects across different categories of data, the enterprise search is similar to performing several queries all together, resulting in bottleneck congestion for the performance of the underlying computer system. The present disclosure addresses these and other technical problems that plague the computer functionality of enterprise search systems and other online services.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Example methods and systems for implementing an enterprise search using database views are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is configured to use stored database views generated from database queries to generate search results for an enterprise search, thereby significantly improving the speed of the enterprise search. As a result of the features disclosed herein, the functioning of the computer system is improved. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
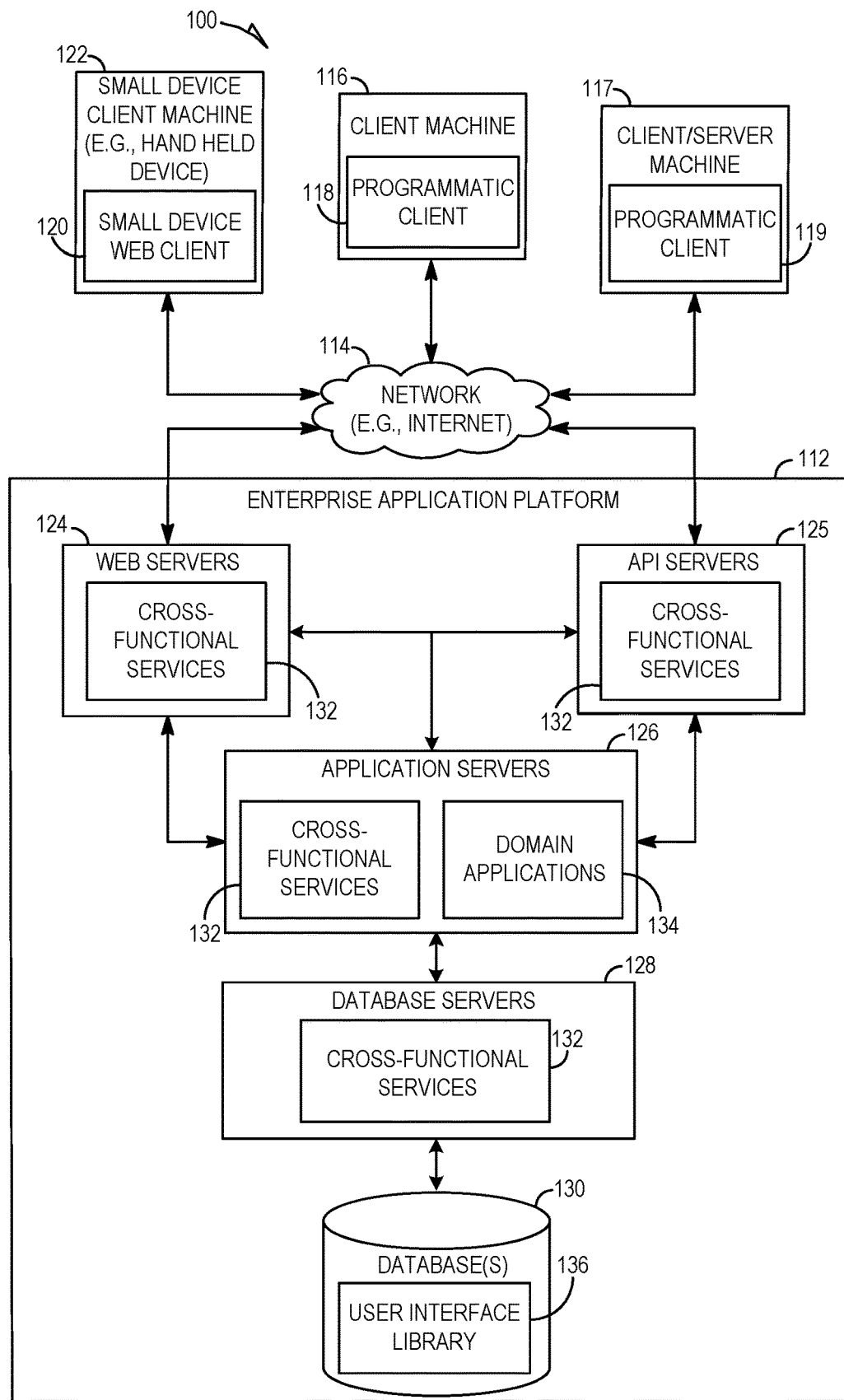
FIG. 1 is a network diagram illustrating a system, in accordance with some example embodiments.

FIG. 1 is a network diagram illustrating a system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-8.

Figure 2:
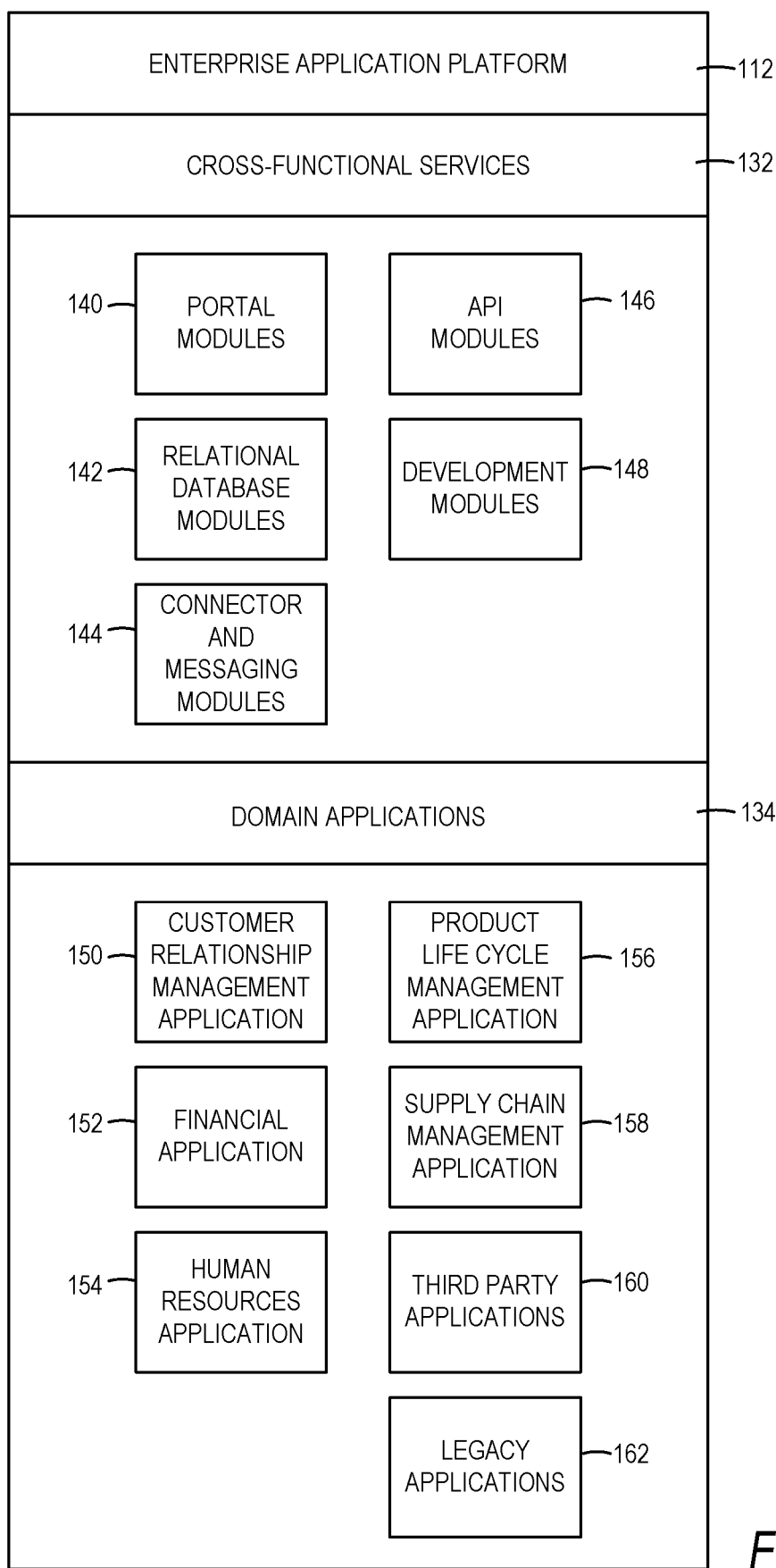
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
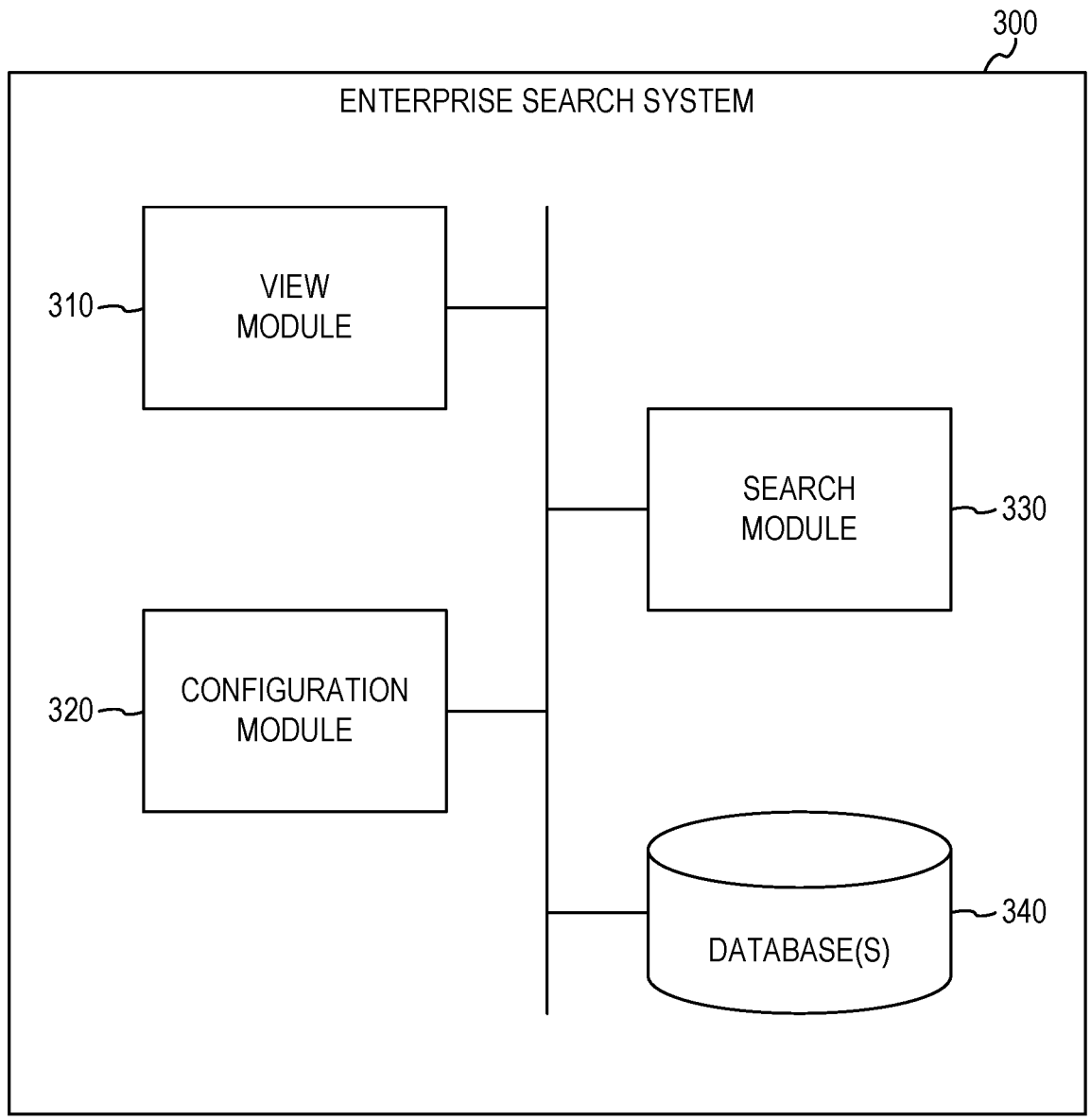
FIG. 3 is a block diagram illustrating an enterprise search system 300, in accordance with some example embodiments.

FIG. 3 is a block diagram illustrating an enterprise search system 300, in accordance with some example embodiments. In some embodiments, the enterprise search system 300 comprises any combination of one or more of a view module 310, a configuration module 320, a search module 330, and one or more database(s) 340. The view module 310, the configuration module 320, the search module 330, and the database(s) 340 can reside on a computer system, or other machine, having a memory and at least one processor (not shown). In some embodiments, the view module 310, the configuration module 320, the search module 330, and the database(s) 340 are incorporated into the enterprise application platform 112 in FIGS. 1 and 2. However, it is contemplated that other configurations of the view module 310, the configuration module 320, the search module 330, and the database(s) 340 are also within the scope of the present disclosure.

In some example embodiments, one or more of the view module 310, the configuration module 320, and the search module 330 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the view module 310, the configuration module 320, and the search module 330 are configured to receive user input. For example, one or more of the view module 310, the configuration module 320, and the search module 330 can present one or more graphical user interface (GUI) elements (e.g., drop-down menu, selectable buttons, text field) with which a user can submit input. In some example embodiments, one or more of the view module 310, the configuration module 320, and the search module 330 are configured to perform various communication functions to facilitate the functionality described herein, such as by communicating with a computing device (e.g., the small device client machine 122, the client machine 116, or the client/server machine 117) via the network 114 using a wired or wireless connection.

In some example embodiments, the view module 310 is configured to receive a plurality of database queries. A database query is a request for data from a database. For example, the database queries received by the view module 310 may request data from the database(s) 340. The requests of the database queries may be to retrieve data. However, data can also be manipulated using the database queries. In some example embodiments, the requested or manipulated data comes from one or more tables, such as tables stored in the database(s) 340.

Each one of the plurality of database queries may be configured to query a column-oriented database. A column-oriented database is a database that stores data tables by column rather than by row. Both columnar and row databases can use traditional database query languages like Structured Query Language (SQL) to load data and perform queries. Both row and columnar databases can become the backbone in a system to serve data for common extract, transform, load (ETL) and data visualization tools. However, by storing data in columns rather than rows, the database can more precisely access the data it needs to answer a query rather than scanning and discarding unwanted data in rows, and query performance may be increased for certain workloads.

In some example embodiments, each one of the plurality of database queries comprises a corresponding SQL statement. SQL is a domain-specific language used in programming and designed for managing data held in a relational database management system (RDBMS), or for stream processing in a relational data stream management system (RDSMS). SQL is particularly useful in handling structured data (e.g., data incorporating relations among entities and variables). The database queries may be configured in forms other than SQL statements as well.

In some example embodiments, the view module 310 is configured to generate a corresponding database view for each database query in the plurality of database queries based on the database query. In a database, a view is the result set of a stored query on the data, which the database users can query just as they would in a persistent database collection object. This pre-established query command is kept in the database dictionary. Unlike ordinary base tables in a relational database, a view does not form part of the physical schema: as a result set, it is a virtual table computed or collated dynamically from data in the database when access to that view is requested. Changes applied to the data in a relevant underlying table are reflected in the data shown in subsequent invocations of the view. In some example embodiments, the corresponding database views may each comprise a result set of the database query, and the result set is arranged in one or more fields of a table. The corresponding database views of the plurality of database queries may each comprise a corresponding column-oriented view.

Figure 4:
FIG. 4 illustrates a database view for a result set of a database query, in accordance with some example embodiments.

In some example embodiments, the view module 310 is configured to cause the corresponding database views to be displayed on a computing device, such as via a GUI of a software application. FIG. 4 illustrates a database view 400 for a result set of a database query, in accordance with some example embodiments. The database view 400 may be displayed on a computing device of a user, such as via a GUI of a software application.

In some example embodiments, the view module 310 is configured to store the corresponding database views of the plurality of database queries. The view module 310 may store the corresponding database views in a database, such as in the database(s) 340. The view module 310 may receive and process (e.g., generate and store database views for) the plurality of database queries separately, where a first database view for a database query is generated and stored, and then a second database view for a second subsequently received database query is subsequently generated and stored, and so forth and so on for the plurality of database queries. The view module 310 may also receive and process (e.g., generate and store database views for) the plurality of database queries as a batch, where corresponding database views for the plurality of database queries are generated together as a batch.

In some example embodiments, the configuration module 320 is configured to generate a corresponding search configuration for each one of the stored database views. Each search configuration may indicate the one or more fields of the table of the corresponding stored database view. In some example embodiments, the search configurations are included within one or more files. Each one of the search configurations may be generated in response to, or otherwise based on, the storing of the database view corresponding to the search configuration. In some example embodiments, the configuration module 320 is configured to store the corresponding search configurations for the stored database views. The configuration module 320 may store the corresponding search configurations in a database, such as in the database(s) 340.

In some example embodiments, the search module 330 is configured to receive an enterprise search query from a computing device. The enterprise search query may comprise one or more terms entered via a full-text search field. In some example embodiments, the plurality of database queries are received via a first software application, and the enterprise search query is received via a second software application different from the first software application. The first software application and the second software application may be cloud-based applications.

In some example embodiments, the search module 330 is configured to generate search results for the enterprise search query based on the one or more terms of the enterprise search query using the stored search configurations to access data in the one or more fields of the tables of the stored database views corresponding to the stored search configurations. The generated search results for the enterprise search query may comprise the accessed data from the one or more fields of the tables of the stored database views corresponding to the stored search configurations.

In some example embodiments, the search module 330 is configured to generate the search results by performing a full-text search using the term(s) entered by a user via the full-text search field. In a full-text search, a search engine examines all of the words in every stored document as it tries to match search criteria (e.g., text specified by a user). Full-text queries may perform linguistic searches against text data in full-text indexes by operating on words and phrases based on the rules of a particular language. Full-text queries can include simple words and phrases or multiple forms of a word or phrase. Full-text search quickly finds all instances of a term in a table without having to scan rows and without having to know which column a term is stored in. In some example embodiments, a full-text search uses text indexes. A text index stores positional information for all terms found in the columns that the text index is created on. Using a text index can be faster than using a regular index to find rows containing a given value.

Figure 5:
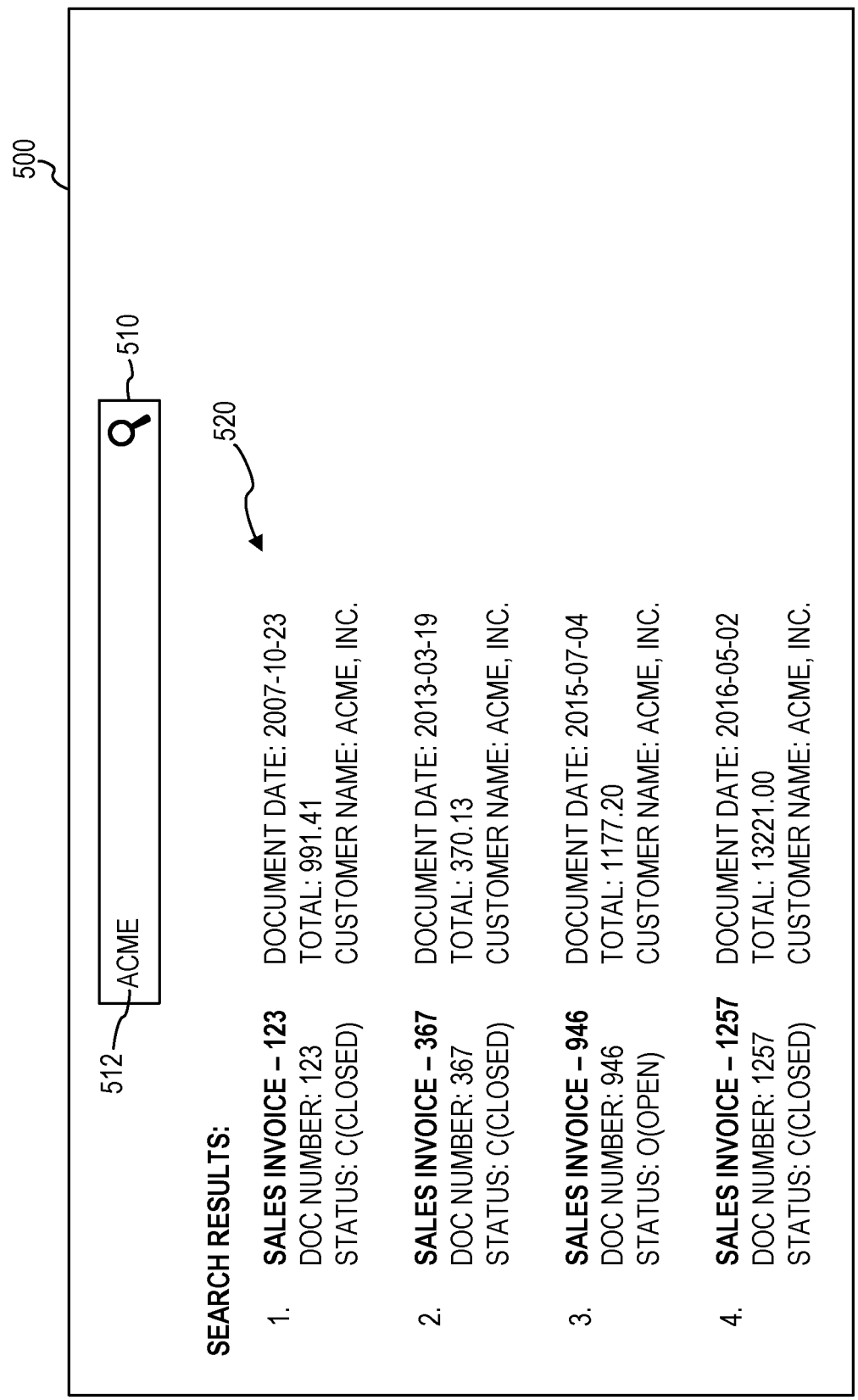
FIG. 5 illustrates a graphical user interface (GUI) displaying search results for an enterprise search query, in accordance with some example embodiments.

In some example embodiments, the search module 330 is configured to cause the generated search results to be displayed on the computing device. For example, the search module 330 may display the generated search results via a GUI of a software application. FIG. 5 illustrates a GUI 500 displaying search results 520 for an enterprise search query, in accordance with some example embodiments. In FIG. 5, the search results 520 are generated based on the term 512 entered by the user via the full-text search field 510.

Figure 6:
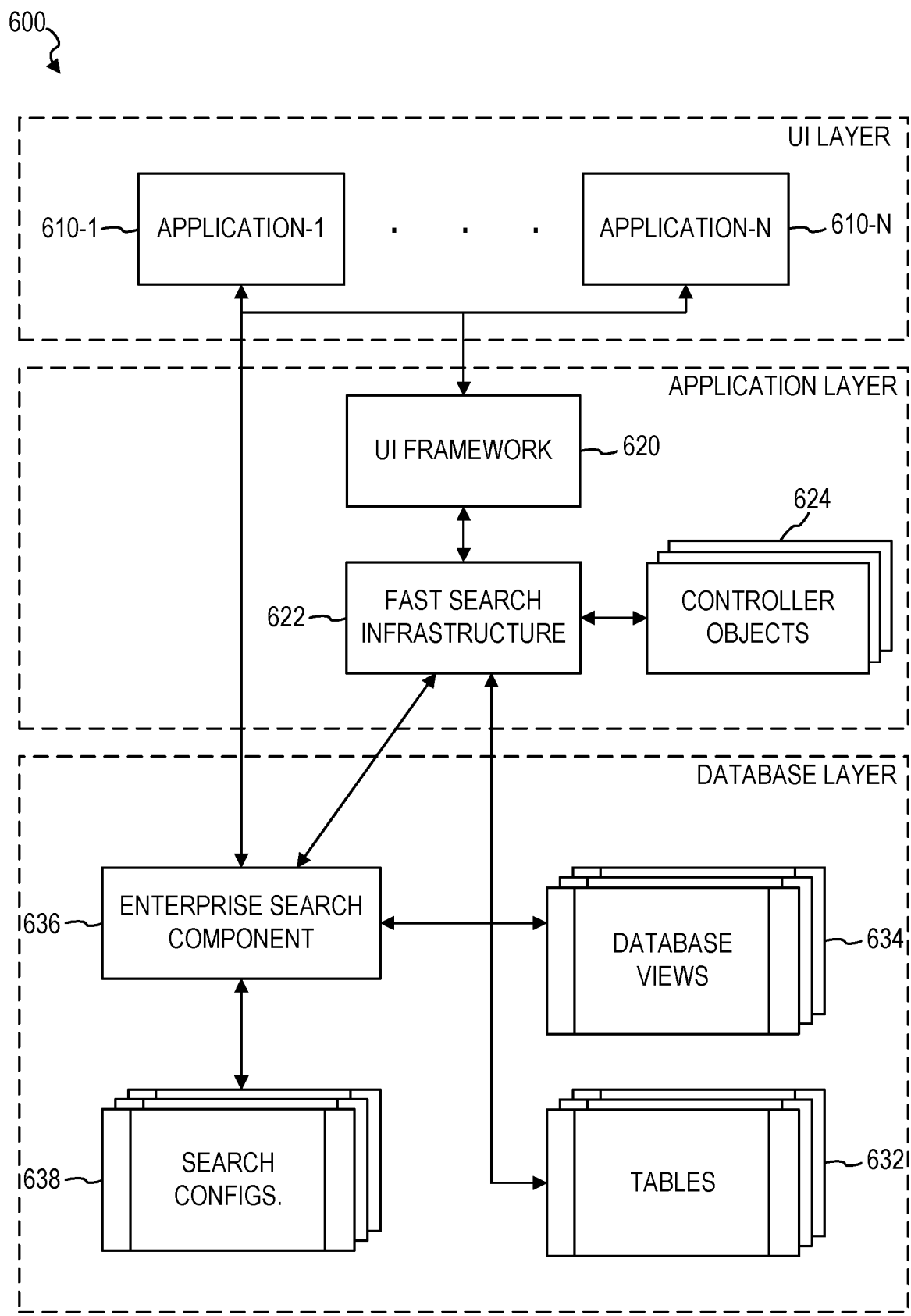
FIG. 6 illustrates a search infrastructure in which the enterprise search system may be implemented, in accordance with some example embodiments.

FIG. 6 illustrates a search infrastructure 600 in which the enterprise search system may be implemented, in accordance with some example embodiments. The search infrastructure 600 may comprise three layers: a user interface (UI) layer, an application layer, and a database layer. Other layers or other configurations of layers are also within the scope of the present disclosure. In some example embodiments, the components of the application layer and the database layer are implemented within the enterprise search system 300 of FIG. 3, which may be implemented within the enterprise application platform 112 of FIGS. 1-2.

In FIG. 6, the UI layer comprises one or more software applications 610 (e.g., software application 610-1, . . . , software application 610-N). Each software application 610 may generate a graphical user interface, which may be displayed on computing devices of users. In some example embodiments, the software applications 610 comprise cloud-based software applications. However, other types of software applications 610 are also within the scope of the present disclosure. In FIG. 6, the application layer comprises a UI framework 620, a fast search infrastructure 622, and controller objects 624. The software applications 610 in the UI layer communicate with the fast search infrastructure 622 via the UI framework 620, and the fast search infrastructure communicates with the controller objects 624. Other components and configurations of the application layer are also within the scope of the present disclosure. In FIG. 6, the database layer comprises tables 632, database views 634, an enterprise search component 636, and search configurations 638.

In some example embodiments, when a user submits a database query via a user interface of one of the software applications 610, the software application 610 communicates the database query to the fast search infrastructure 622 via the UI framework 620, and the fast search infrastructure 622 generates one or more database views 634 by accessing and searching the tables 632. The generated database views 634 are stored in the database layer and may comprise data from the accessed tables 632. The enterprise search component 636 may detect the generating or storing of the database views 634 and, in response to or otherwise based on the detection of the generating or storing of the database views 634, generate and store corresponding search configurations 638 for the generated and stored database views 634.

In some example embodiments, the enterprise search component 636 receives an enterprise search query. The enterprise search query may be communicated from one of the software applications 610 via the UI framework and the fast search infrastructure 622 of the application layer or may be communicated from the software application 610 directly to the enterprise search component 636. In some example embodiments, the enterprise search component 636 generates search results for the enterprise search query based on one or more terms of the enterprise search query using the stored search configurations 638 to access data in the one or more fields of the stored database views 634 corresponding to the stored search configurations 638. The enterprise search component 636 may then cause the generated search results to be displayed on a computing device via a GUI of the software application 610.

By leveraging the database views already generated in response to previous database queries, the enterprise search component 636 improves the speed at which it can respond to enterprise search queries. The search configurations 638 are used to bridge the gap between search results generated for enterprise search queries and database views generated for database queries, thereby providing feature parity across different software applications 610 and different search or query platforms.

Figure 7:
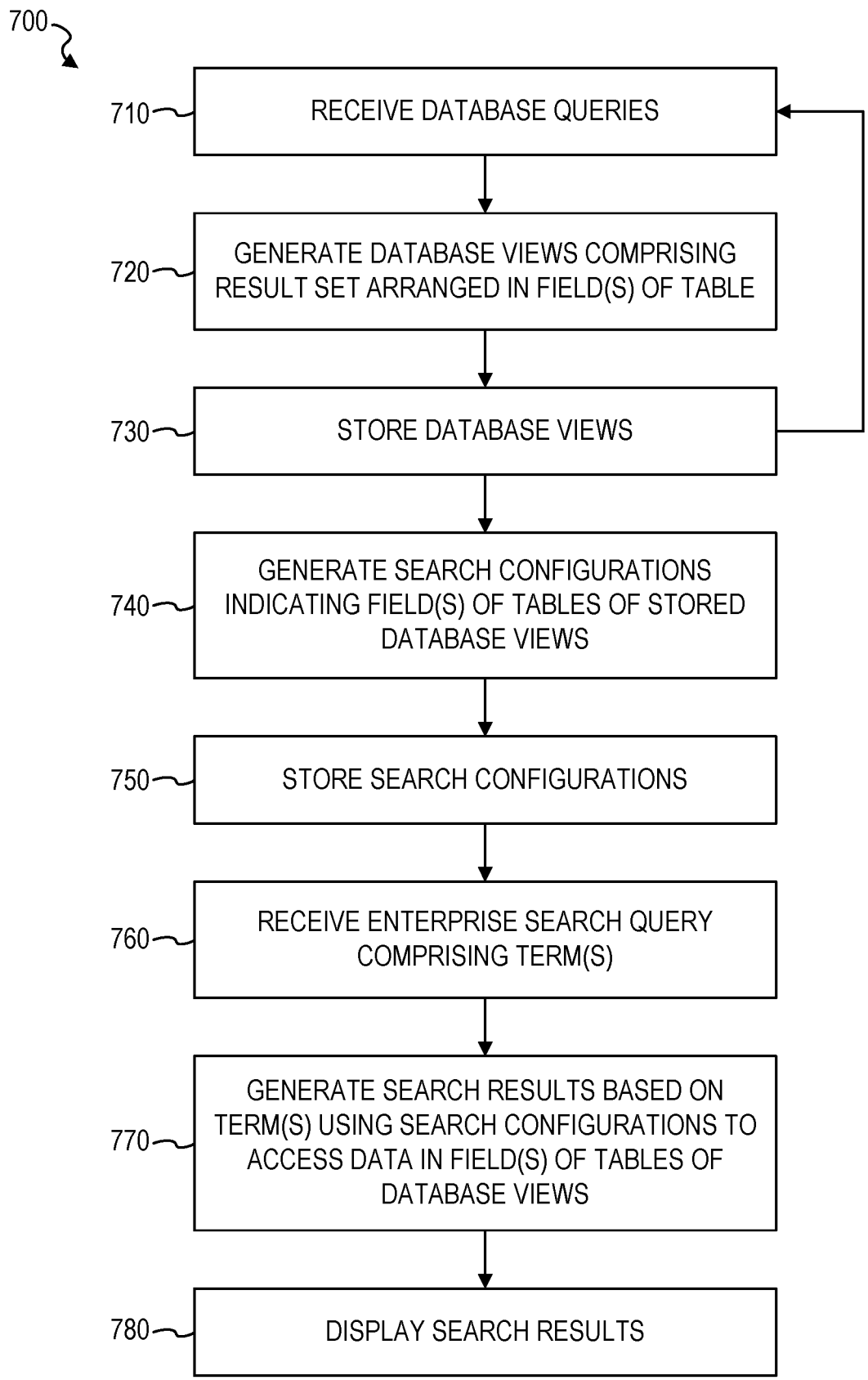
FIG. 7 is a flowchart illustrating a method of implementing an enterprise search using database views, in accordance with some example embodiments.

FIG. 7 is a flowchart illustrating a method 700 of implementing an enterprise search using database views, in accordance with some example embodiments. The method 700 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 700 are performed by the enterprise search system 300 of FIG. 3, or any combination of one or more of its modules 310, 320, and 330, as described above.

At operation 710, the enterprise search system 300 receives a plurality of database queries. In some example embodiments, each one of the plurality of database queries is configured to query a column-oriented database. Each one of the plurality of database queries may comprise a corresponding structured query language (SQL) statement.

At operation 720, the enterprise search system 300, for each database query in the plurality of database queries, generates a corresponding database view based on the database query. In some example embodiments, the corresponding database view comprises a result set of the database query, and the result set is arranged in one or more fields of a table. The corresponding database views of the plurality of database queries may each comprise a corresponding column-oriented view. In some example embodiments, the enterprise search system 300 causes the corresponding database views to be displayed on a computing device, such as via the software application(s) 410.

At operation 730, the enterprise search system 300 stores the corresponding database views of the plurality of database queries. In some example embodiments, the enterprise search system 300 stores the corresponding database views in a database, such as in the database(s) 340. In some example embodiments, the enterprise search system 300 performs the receiving operation 710, the generating operation 720, and the storing operation 730 for each database query separately (e.g., performing operations 710, 720, and 730 first for a received database query, then subsequently performing operations 710, 720, and 730 for a subsequently received database query). In other example embodiments, the enterprise search system 300 processes the plurality of database queries as a batch (e.g., receiving the plurality of database queries together as a batch at operation 710, then generating the database views together as a batch at operation 720, and finally storing the generated database views together as a batch at operation 730).

At operation 740, the enterprise search system 300, for each one of the stored database views, generates a corresponding search configuration for the stored database view. In some example embodiments, the corresponding search configuration indicates the one or more fields of the table of the stored database view. Each one of the search configurations may be generated in response to the database view corresponding to the search configuration being stored.

At operation 750, the enterprise search system 300 stores the corresponding search configurations for the stored database views. In some example embodiments, the enterprise search system 300 stores the corresponding search configurations in a database, such as in the database(s) 340.

At operation 760, the enterprise search system 300 receives an enterprise search query from a computing device. In some example embodiments, the enterprise search query comprises one or more terms entered via a full-text search field. The plurality of database queries may be received via a first software application, and the enterprise search query may be received via a second software application different from the first software application. In some example embodiments, the first software application is a cloud-based application, and the second software application is a cloud-based application.

At operation 770, the enterprise search system 300 generates search results for the enterprise search query based on the one or more terms of the enterprise search query using the stored search configurations to access data in the one or more fields of the tables of the stored database views corresponding to the stored search configurations. In some example embodiments, the generated search results for the enterprise search query comprise the accessed data from the one or more fields of the tables of the stored database views corresponding to the stored search configurations.

At operation 780, the enterprise search system 300 causes the generated search results to be displayed on the computing device. For example, the enterprise search system 300 may display the generated search results via the GUI 600 in FIG. 6.

The enterprise search system 300 may implement client affinity in data, where a multi-client solution is implemented via a multi-tenancy architecture, and the database views and the search configurations that are defined on top of the database views deliver client or tenant dependent results. In some example embodiments, the generating of the corresponding database view comprises determining the result set of the corresponding database query via a multi-tenancy architecture based on a tenant identification from which the corresponding database query was received, and the generating of the corresponding search configuration is based on the tenant identification.

The enterprise search system 300 may implement end user extensions. Similar to the client affinity based database views, the client specific end user extensions are part of the enterprise search queries and are considered in the search configurations that are developed. In some example embodiments, the generating of the corresponding database view comprises determining the result set of the corresponding database query based on one or more end user extension fields of the corresponding database query was received, and the generating of the corresponding search configuration is based on the one or more end user extension fields. The extension fields may comprise fields that are added to a query at the direction of the end user. In one example, a default configuration of query fields via which end users may enter search parameters (e.g., keywords) is provided to an end user, and the end user adds one or more extension fields for the query, thereby enabling the end user to use the added extension field(s) as part of the query. In some example embodiments, the end user is required to have authorization to add an extension field, such as by being assigned as a key user that has special privileges.

The enterprise search system 300 may implement role-based authorization enforcement, where the data that is delivered out of the search configurations is automatically filtered based on the role assignments defined for the end user in the enterprise search system 300. The database views and the search configurations may derive the authorization data and filter the output results based on the authorization data. In some example embodiments, the search results for the enterprise search query are based on a determined based on a role of an end user from which the corresponding enterprise search query is received, with the enterprise search results being filtered based on the role of the end user.

It is contemplated that any of the other features described within the present disclosure can be incorporated into the method 700.

The following paragraphs provide example embodiments.

Example 1 includes a computer-implemented method comprising: receiving, by at least one hardware processor, a plurality of database queries; for each database query in the plurality of database queries, generating, by the at least one hardware processor, a corresponding database view based on the database query, the corresponding database view comprising a result set of the database query, the result set arranged in one or more fields of a table; storing, by the at least one hardware processor, the corresponding database views of the plurality of database queries; for each one of the stored database views, generating, by the at least one hardware processor, a corresponding search configuration for the stored database view, the corresponding search configuration indicating the one or more fields of the table of the stored database view; storing, by the at least one hardware processor, the corresponding search configurations for the stored database views; receiving, by the at least one hardware processor, an enterprise search query from a computing device, the enterprise search query comprising one or more terms entered via a full-text search field; generating, by the at least one hardware processor, search results for the enterprise search query based on the one or more terms of the enterprise search query using the stored search configurations to access data in the one or more fields of the tables of the stored database views corresponding to the stored search configurations; and causing, by the at least one hardware processor, the generated search results to be displayed on the computing device.

Example 2 includes the computer-implemented method of example 1, wherein each one of the plurality of database queries is configured to query a column-oriented database, and the corresponding database views of the plurality of database queries each comprise a corresponding column-oriented view.

Example 3 includes the computer-implemented method of example 1 or example 2, wherein each one of the plurality of database queries comprises a corresponding structured query language (SQL) statement.

Example 4 includes the computer-implemented method of any one of examples 1 to 3, wherein each one of the search configurations is generated in response to the database view corresponding to the search configuration being stored.

Example 5 includes the computer-implemented method of any one of examples 1 to 4, wherein the plurality of database queries are received via a first software application, and the enterprise search query is received via a second software application different from the first software application.

Example 6 includes the computer-implemented method of any one of examples 1 to 5, wherein the first software application is a cloud-based application, and the second software application is a cloud-based application.

Example 7 includes the computer-implemented method of any one of examples 1 to 6, wherein the generated search results for the enterprise search query comprise the accessed data from the one or more fields of the tables of the stored database views corresponding to the stored search configurations.

Example 8 includes the computer-implemented method of any one of examples 1 to 7, wherein: the generating of the corresponding database view comprises determining the result set of the corresponding database query via a multi-tenancy architecture based on a tenant identification from which the corresponding database query was received; and the generating of the corresponding search configuration is based on the tenant identification.

Example 9 includes the computer-implemented method of any one of examples 1 to 8, wherein: the generating of the corresponding database view comprises determining the result set of the corresponding database query based on one or more end user extension fields of the corresponding database query was received; and the generating of the corresponding search configuration is based on the one or more end user extension fields.

Example 10 includes the computer-implemented method of any one of examples 1 to 9, wherein the search results for the enterprise search query are based on a determined based on a role of an end user from which the corresponding enterprise search query is received, the enterprise search results being filtered based on the role of the end user.

Example 11 includes a system comprising: at least one processor; and a non-transitory computer-readable medium storing executable instructions that, when executed, cause the at least one processor to perform the method of any one of examples 1 to 10.

Example 12 includes a non-transitory machine-readable storage medium, tangibly embodying a set of instructions that, when executed by at least one processor, causes the at least one processor to perform the method of any one of examples 1 to 10.

Example 13 includes a machine-readable medium carrying a set of instructions that, when executed by at least one processor, causes the at least one processor to carry out the method of any one of examples 1 to 10.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
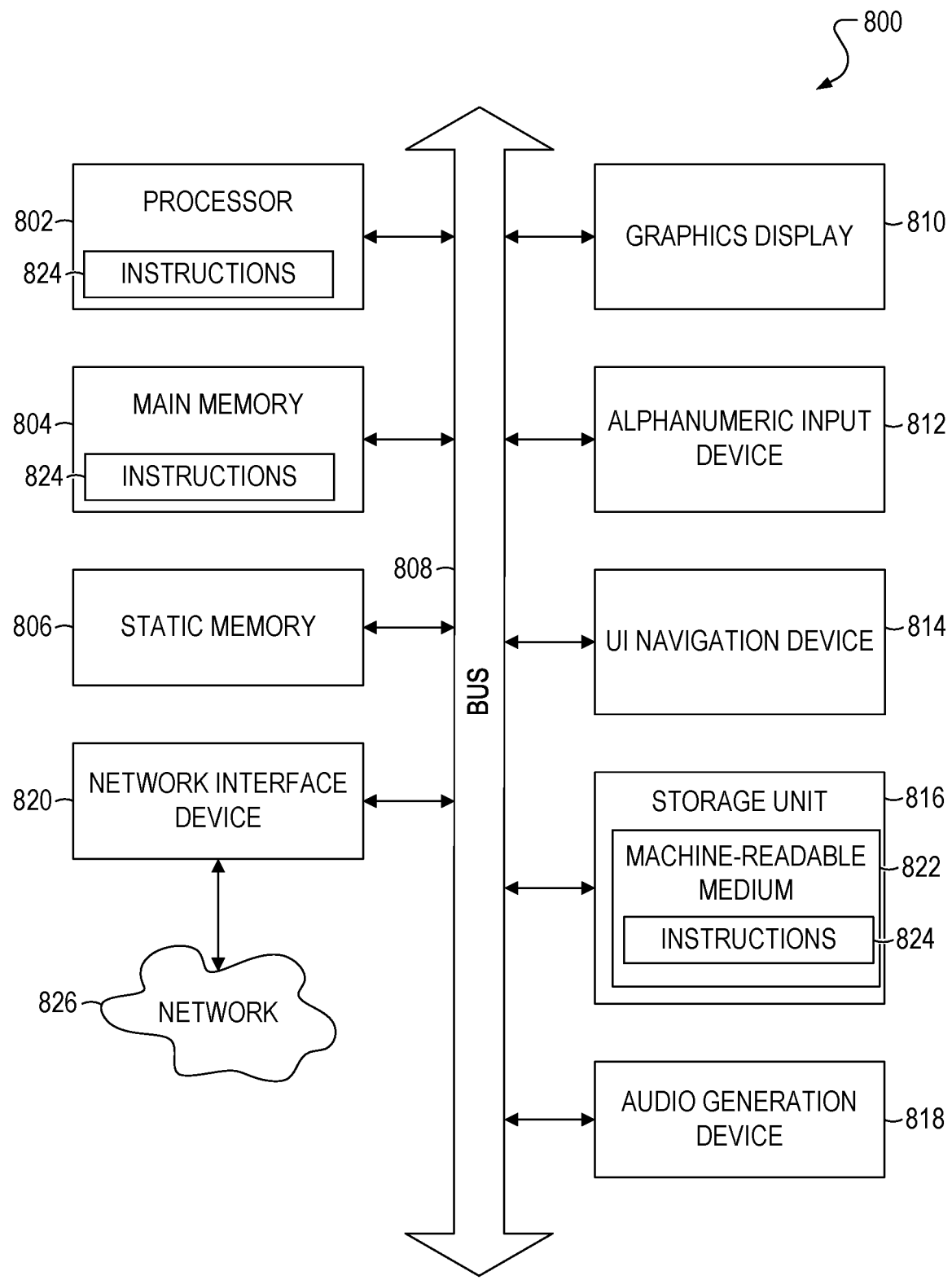
FIG. 8 is a block diagram of an example computer system on which methodologies described herein can be executed, in accordance with some example embodiments.

FIG. 8 is a block diagram of a machine in the example form of a computer system 800 within which instructions 824 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804, and a static memory 806, which communicate with each other via a bus 808. The computer system 800 may further include a graphics or video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a storage unit (e.g., a disk drive unit) 816, an audio or signal generation device 818 (e.g., a speaker), and a network interface device 820.

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside, completely or at least partially, within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:
generating a search configuration for a stored database view, the stored database view comprising a result set of a database query, the result set arranged in one or more fields of a table, the search configuration indicating the one or more fields of the table of the stored database view;
storing the search configuration;
receiving an enterprise search query from a computing device, the enterprise search query comprising one or more terms entered via a full-text search field; and
generating search results for the enterprise search query based on the one or more terms of the enterprise search query using the stored search configuration to access data in the one or more fields of the table of the stored database view.

2. The computer-implemented method of claim 1, further comprising:
causing the generated search results to be displayed on the computing device.

3. The computer-implemented method of claim 1, wherein the database query is configured to query a column-oriented database, and the stored database view comprises a column-oriented view.

4. The computer-implemented method of claim 1, wherein the database query comprises a structured query language (SQL) statement.

5. The computer-implemented method of claim 1, wherein the search configuration is generated in response to the database view being stored.

6. The computer-implemented method of claim 1, wherein the database query is received via a first software application, and the enterprise search query is received via a second software application different from the first software application.

7. The computer-implemented method of claim 6, wherein the first software application is a cloud-based application, and the second software application is a cloud-based application.

8. The computer-implemented method of claim 1, wherein the generated search results for the enterprise search query comprise the accessed data from the one or more fields of the table of the stored database view corresponding to the stored search configuration.

9. A system comprising:
at least one hardware processor; and
a non-transitory computer-readable medium storing executable instructions that, when executed, cause the at least one hardware processor to perform operations comprising:
generating a search configuration for a stored database view, the stored database view comprising a result set of a database query, the result set arranged in one or more fields of a table, the search configuration indicating the one or more fields of the table of the stored database view;
storing the search configuration;
receiving an enterprise search query from a computing device, the enterprise search query comprising one or more terms entered via a full-text search field; and
generating search results for the enterprise search query based on the one or more terms of the enterprise search query using the stored search configuration to access data in the one or more fields of the table of the stored database view.

10. The system of claim 9, wherein the operations further comprise:
causing the generated search results to be displayed on the computing device.

11. The system of claim 9, wherein the database query is configured to query a column-oriented database, and the stored database view comprises a column-oriented view.

12. The system of claim 9, wherein the database query comprises a structured query language (SQL) statement.

13. The system of claim 9, wherein the search configuration is generated in response to the database view being stored.

14. The system of claim 9, wherein the database query is received via a first software application, and the enterprise search query is received via a second software application different from the first software application.

15. The system of claim 14, wherein the first software application is a cloud-based application, and the second software application is a cloud-based application.

16. The system of claim 9, wherein the generated search results for the enterprise search query comprise the accessed data from the one or more fields of the table of the stored database view corresponding to the stored search configuration.

17. A non-transitory machine-readable storage medium, tangibly embodying a set of instructions that, when executed by at least one hardware processor, causes the at least one hardware processor to perform operations comprising:
generating a search configuration for a stored database view, the stored database view comprising a result set of a database query, the result set arranged in one or more fields of a table, the search configuration indicating the one or more fields of the table of the stored database view;
storing the search configuration;
receiving an enterprise search query from a computing device, the enterprise search query comprising one or more terms entered via a full-text search field; and
generating search results for the enterprise search query based on the one or more terms of the enterprise search query using the stored search configuration to access data in the one or more fields of the table of the stored database view.

18. The non-transitory machine-readable storage medium of claim 17, wherein the operations further comprise:
causing the generated search results to be displayed on the computing device.

19. The non-transitory machine-readable storage medium of claim 17, wherein the database query is configured to query a column-oriented database, and the stored database view comprises a column-oriented view.

20. The non-transitory machine-readable storage medium of claim 17, wherein the database query comprises a structured query language (SQL) statement.

* * * * *